United States Patent
Ahn et al.

(10) Patent No.: US 11,475,810 B1
(45) Date of Patent: Oct. 18, 2022

(54) THREE-DIMENSIONAL KINETIC SHAPE DISPLAY FOR PROVIDING VEHICLE INFORMATION

(71) Applicant: GM Global Technology Operations LLC, Detroit, MI (US)

(72) Inventors: Ki Hyun Ahn, Lake Orion, MI (US); Joseph F. Szczerba, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/567,514

(22) Filed: Jan. 3, 2022

(51) Int. Cl.
*G09G 3/00* (2006.01)
*G09G 3/20* (2006.01)
*B60R 11/02* (2006.01)
B60R 11/00 (2006.01)
B60K 35/00 (2006.01)

(52) U.S. Cl.
CPC ............ *G09G 3/03* (2020.08); *B60R 11/0235* (2013.01); *G09G 3/2003* (2013.01); *B60K 35/00* (2013.01); *B60K 2370/164* (2019.05); *B60K 2370/166* (2019.05); *B60K 2370/67* (2019.05); *B60R 2011/008* (2013.01); *G09G 2300/0452* (2013.01); *G09G 2380/10* (2013.01)

(58) Field of Classification Search
CPC .................. G09G 3/03; G09G 3/2003; G09G 2300/0452; G09G 2380/10; B60R 11/0235; B60R 2011/008; B60R 11/00; B60K 2370/67; B60K 2370/166; B60K 2370/164; B60K 35/00; B60K 37/06; G01C 21/3688; G06F 3/0234; G06F 3/04886; F16D 65/0031
See application file for complete search history.

(56) References Cited

U.S. PATENT DOCUMENTS

| | | | |
|---|---|---|---|
| 2009/0047197 A1* | 2/2009 | Browne | F16D 65/0031 422/243 |
| 2009/0250267 A1* | 10/2009 | Heubel | G06F 3/04886 178/18.03 |
| 2011/0285618 A1* | 11/2011 | Browne | B60K 37/06 345/156 |
| 2012/0091744 A1* | 4/2012 | McKnight | B60R 11/00 296/24.34 |
| 2018/0290541 A1* | 10/2018 | Pitrat | G01C 21/3688 |
| 2018/0370364 A1* | 12/2018 | Vassily | G06F 3/0234 |

\* cited by examiner

*Primary Examiner* — Richard J Hong
(74) *Attorney, Agent, or Firm* — Vivacqua Crane, PLLC (57) ABSTRACT

A three-dimensional kinetic shape display for a vehicle includes one or more pixels for conveying information related to operation of the vehicle. The one or more pixels each include a plurality of moveable members that each have an actuation element for translating the moveable member. The three-dimensional kinetic shape display also includes one or more controllers providing instructions to move the actuation element. The one or more controllers execute instructions to receive data indicating an event related to operation of the vehicle, and in response to receiving data indicating the event, instruct the actuation element to translate the moveable member in a direction that is indicative of the event related to operation of the vehicle.

20 Claims, 8 Drawing Sheets

THREE-DIMENSIONAL KINETIC SHAPE DISPLAY FOR PROVIDING VEHICLE INFORMATION

INTRODUCTION

The present disclosure relates to a three-dimensional kinetic shape display including one or more pixels that include a plurality of moveable members for conveying information related to operation of a vehicle. More particularly, the present disclosure is related towards a three-dimensional kinetic shape display where the moveable members each include an actuation element for translating a corresponding pixel and a light distributing element for conveying visible light.

A vehicle may include various devices for conveying information to its respective occupants. For example, a heads-up display is a technology that projects an image onto a windshield or a panel, just beneath a line of sight. In another example, a display unit including a screen for showing images and text that convey information related to items such as, for example, navigation, operation of the vehicle, and entertainment information may be used instead to convey information to a vehicle's occupants.

In the event the vehicle is an autonomous or semi-autonomous vehicle, then it may be advantageous to provide the occupants with situational awareness of the vehicle's navigational intent. For example, occupants may want to know that the autonomous driving system of a vehicle is aware of an upcoming sharp curve in the highway or an imminent turn, and that the autonomous driving system plans to maneuver the vehicle to complete the upcoming curve or turn.

Thus, while current vehicles achieve their intended purpose, there is a need in the art for an approach that conveys information related to the operation of the vehicle. In particular, there is a need in the art for an approach that informs occupants of an autonomous vehicle with situational awareness of the vehicle's navigational intent.

SUMMARY

According to several aspects, a three-dimensional kinetic shape display for a vehicle is disclosed. The three-dimensional kinetic shape display includes one or more pixels for conveying information related to operation of the vehicle. The one or more pixels each include a plurality of moveable members that each have an actuation element for translating the moveable member. The one or more controllers providing instructions to move the actuation element, where the one or more controllers execute instructions to receive data indicating an event related to operation of the vehicle, and in response to receiving data indicating the event, instruct the actuation element to translate the moveable member in a direction that is indicative of the event related to operation of the vehicle.

In an aspect, the moveable members further comprise a light distributing element conveying visible light.

In another aspect, three-dimensional kinetic shape display further includes a lighting source in electronic communication with the one or more controllers, where the lighting source is in optical communication with the lighting distributing element.

In yet another aspect, in response to receiving data indicating an event, the one or more controllers instruct the lighting source to generate the visible light based on the event related to operation.

In an aspect, where the lighting source emits visible light in more than one color.

In another aspect, the lighting source is either one or more light-emitting diodes (LEDs) or a fiber optic element.

In yet another aspect, the light distributing element is a light pipe that conveys the visible light.

In an aspect, the three-dimensional kinetic shape display further includes a source of air in electronic communication with the one or more controllers, where the actuation element is an inflatable bladder that is in fluid communication with the source of air.

In another aspect, the inflatable bladder is inflatable from a completely deflated position into a fully inflated position.

In yet another aspect, the moveable member lies flat against a mounting surface when the inflatable bladder is in the completely deflated position.

In an aspect, the moveable member is orthogonal with respect to the mounting surface when the inflatable bladder in the fully inflated position.

In another aspect, the one or more pixels include up to six moveable members.

In yet another aspect, the three-dimensional kinetic shape display further comprises an array of pixels arranged along a mounting surface of the vehicle.

In an aspect, a portion of the array of pixels include moveable members that are of a different size when compared to a remainder of the array of pixels.

In another aspect, the array of pixels 14 includes a plurality of pixels that include moveable members that are identical in size.

In yet another aspect, the array of pixels are arranged in a symmetrical pattern in a direction orthogonal to one another.

In an aspect, the array of pixels create a wave of visible light and pixel movement that is dispersed along the array of pixels to indicate an upcoming maneuver that the vehicle completes during autonomous driving.

In another aspect, the upcoming maneuver is an acceleration or a deceleration of the vehicle.

In an aspect, a three-dimensional kinetic shape display for a vehicle is disclosed. The three-dimensional kinetic shape display includes one or more pixels for conveying information related to operation of the vehicle, where the one or more pixels each include a plurality of moveable members that each have an inflatable bladder for translating the moveable member and a light distributing element conveying visible light. The three-dimensional kinetic shape display further includes a lighting source in optical communication with the lighting distributing element. The three-dimensional kinetic shape display also includes a source of air in fluid communication with the inflatable bladder. Finally, the three-dimensional kinetic shape display includes one or more controllers in electronic communication with the lighting source and the source of air. The one or more controllers execute instructions to receive data indicating an event related to operation of the vehicle. In response to receiving data indicating the event, the one or more controllers instruct the source of air to either inflate or deflate the inflatable bladder based on the event related to operation of the vehicle. In response to receiving data indicating the event, the one or more controllers instruct the lighting source to generate the visible light based on the event related to operation of the vehicle.

In another aspect, the moveable member lies flat against a mounting surface when the inflatable bladder is in a completely deflated position.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
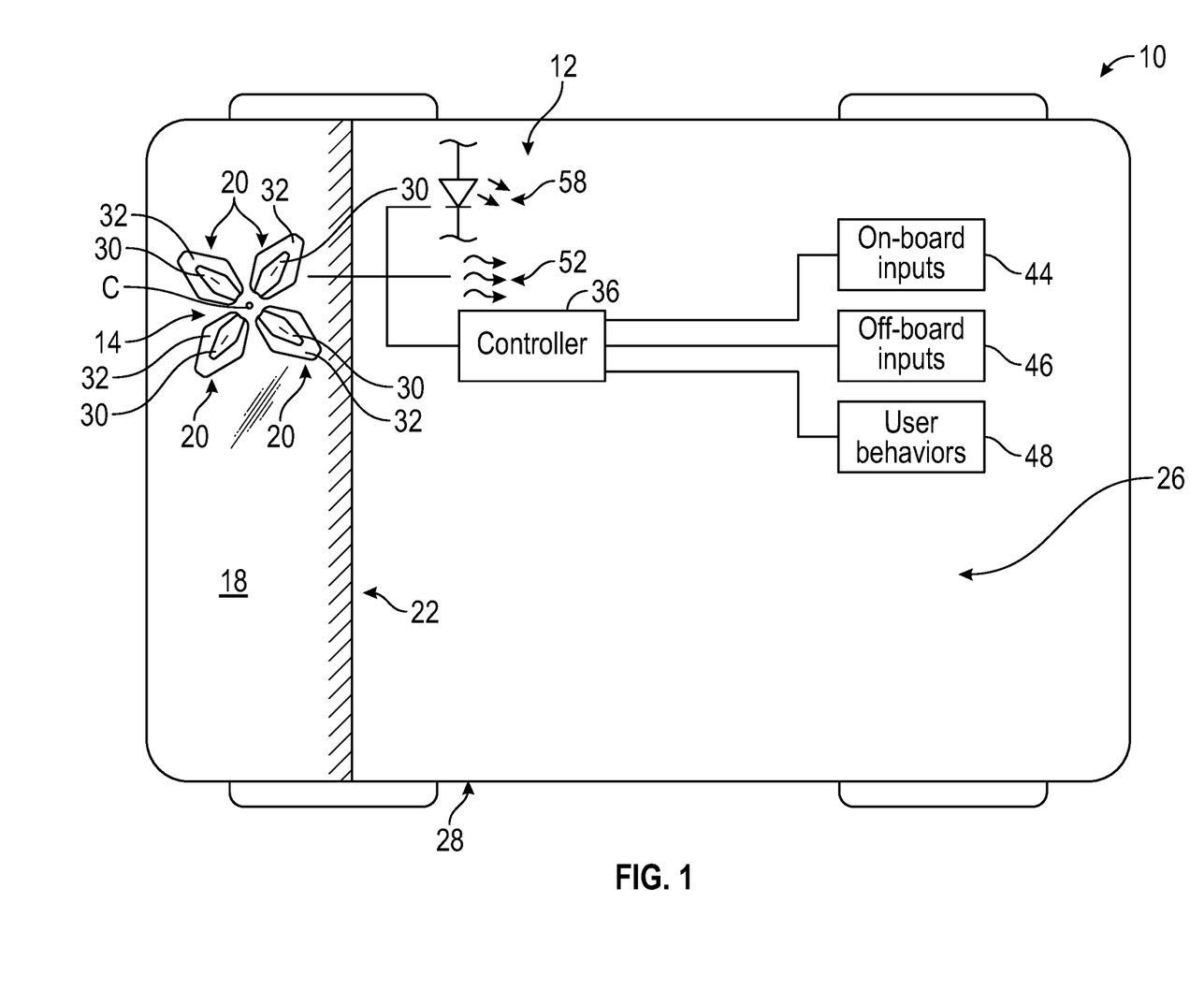
FIG. 1 is a schematic diagram of an exemplary vehicle including the disclosed three-dimensional kinetic shape display, according to an exemplary embodiment.

Referring to FIG. 1, an exemplary vehicle 10 including a three-dimensional kinetic shape display 12 is shown. The three-dimensional kinetic shape display 12 includes one or more pixels 14 having a plurality of moveable members 20 for conveying information related to operation of the vehicle 10. The vehicle 10 may be any type of vehicle such as, but not limited to, a sedan, truck, sport utility vehicle, van, or motor home. In an embodiment, the vehicle 10 is an autonomous or semi-autonomous vehicle, however, it is to be appreciated that a vehicle that is manually driven by an individual may be used as well. The moveable members 20 are disposed along one or more mounting surfaces 18 of the vehicle 10. Each moveable member 20 includes an actuation element 30 for translating a corresponding moveable member 20 and a light distributing element 32 for conveying visible light. The three-dimensional kinetic shape display 12 further includes one or more controllers 36 for moving the actuation element 30 and illuminating the light distributing element 32 for each moveable member 20.

Figure 2A:
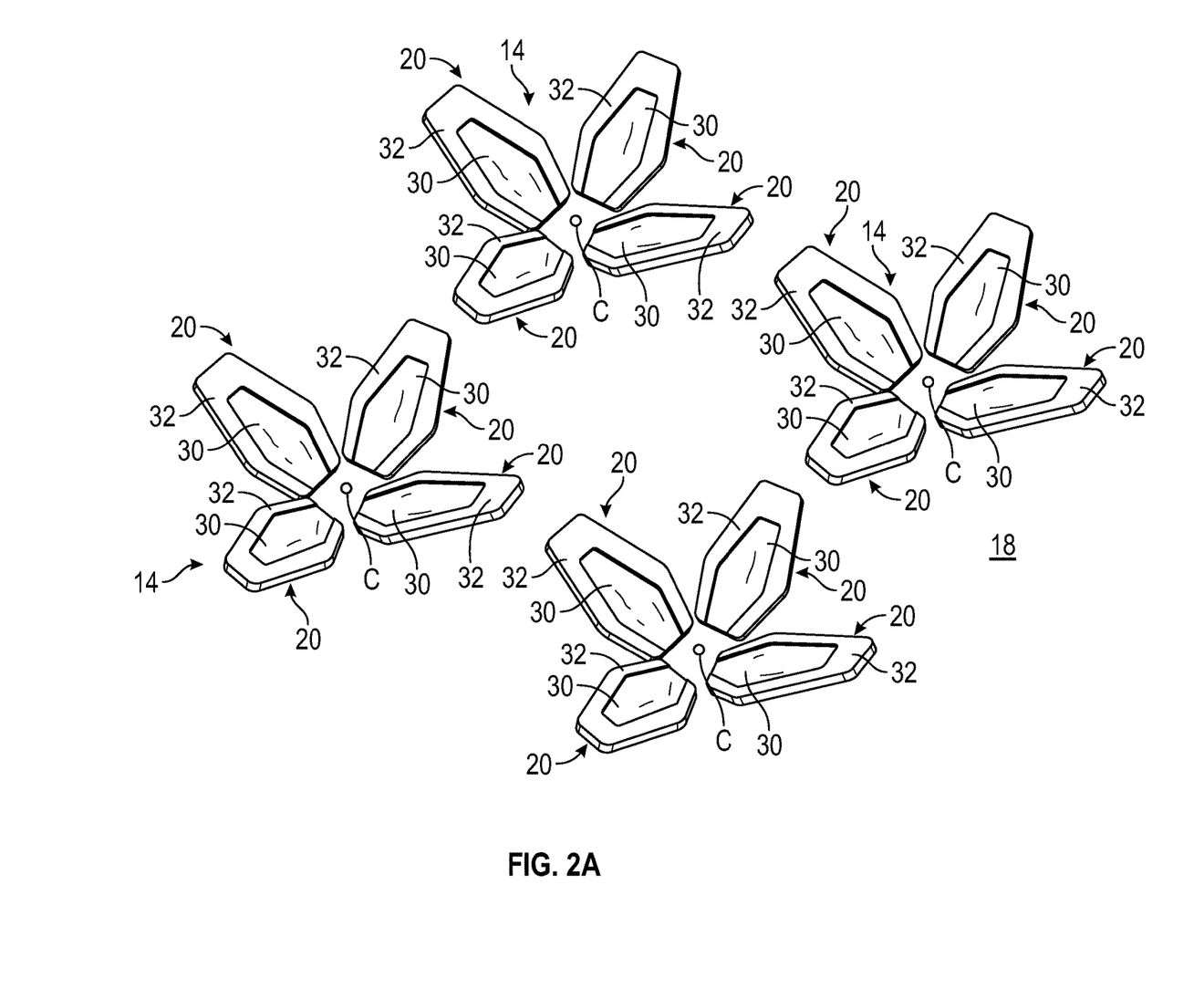
FIG. 2A is a perspective view of an embodiment of the pixels having four moveable members for conveying information related to operation of the vehicle, according to an exemplary embodiment.

As explained below, the one or more controllers 36 receive data indicating an event related to operation of the vehicle 10. The one or more controllers 36 instruct the actuation elements 30 to translate the moveable members 20 in a direction indicative of the event related to operation of the vehicle 10. As seen in FIGS. 1 and 2A, the moveable members 20 of each pixel 14 are individually actuated fins that may be moved relative to the mounting surface 18 to convey information related to the event. In embodiments, the one or more controllers 36 also instruct the light distributing elements 32 to illuminate based on the event related to operation of the vehicle 10. In this manner, the three-dimensional kinetic shape display 12 displays contextual driving information to individuals. For example, as explained below, the individual pixels 14 of the three-dimensional kinetic shape display 12 may be actuated and illuminated to inform occupants of an upcoming maneuver when the vehicle 10 operates autonomously.

The one or more controllers 36 receive input from a variety of sources related to an environment surrounding the vehicle 10 and vehicle operational parameters. In an embodiment, the one or more controllers 36 receive information related to one or more on-board inputs 44, one or more off-board inputs 46, and user behaviors 48. The one or more on-board inputs 44 include, but are not limited to, braking state, vehicle state-of-charge information, vehicle speed, vehicle driving angle, external camera and sensor outputs, advanced driver-assistance system (ADAS) information, automated driving system information, and driver monitoring system (DMS) camera output. The one or more off-board inputs 46 include, but are not limited to, global positioning system (GPS) information, navigation information, traffic information, information received by satellite, information received by vehicle-to-everything (V2X) communication, road database information, weather information, and information received over cellular networks. The user behaviors 48 include, but are not limited to, driver state, driver behavior, and control use.

Figure 2B:
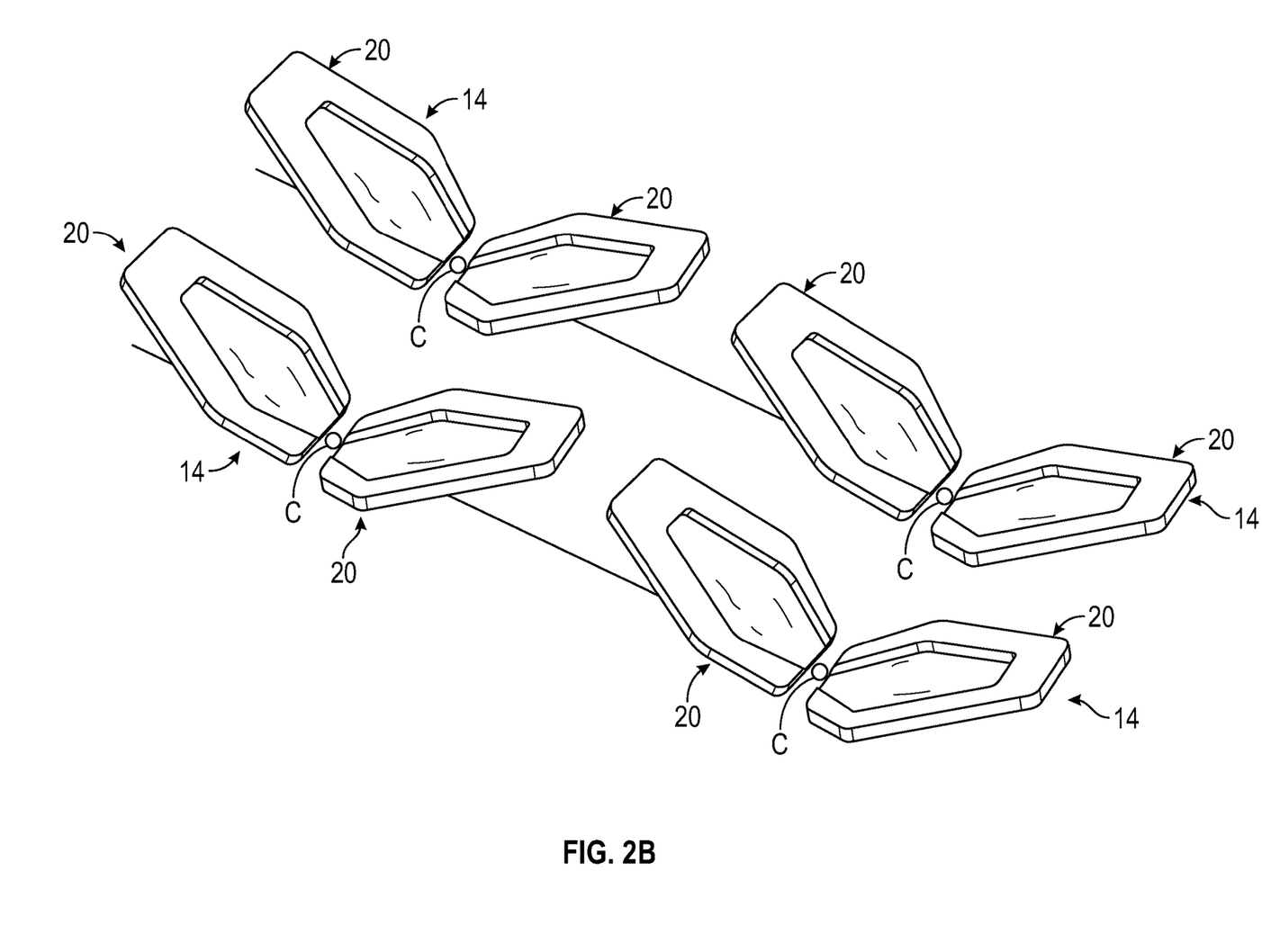
FIG. 2B is a perspective view of another embodiment of the pixels having two moveable members, according to an exemplary embodiment.
Figure 2C:
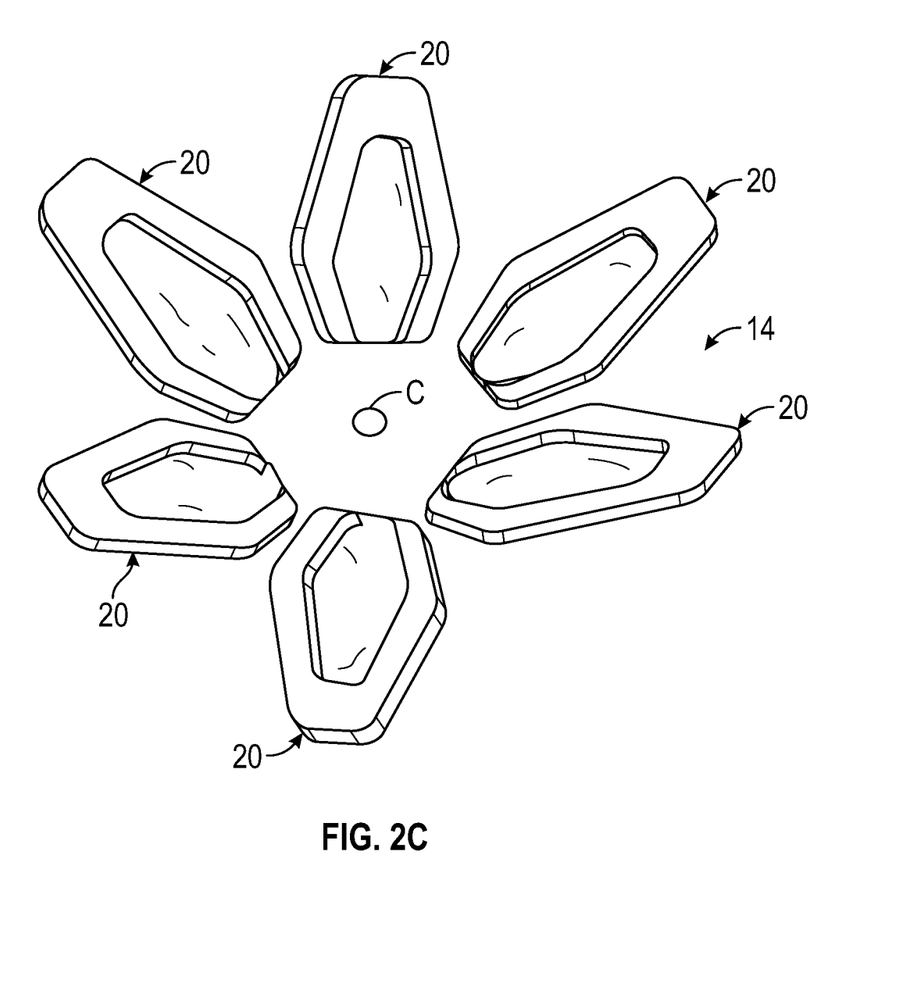
FIG. 2C is a perspective view of yet another embodiment of the pixels having six moveable members, according to an exemplary embodiment.

In the embodiment as shown in FIG. 1, the moveable members 20 are disposed along the mounting surface 18 of an instrument panel 22, however, it is to be appreciated that the figures are merely exemplary in nature, and the moveable members 20 may be disposed in a variety of locations either within an interior cabin 26 or an exterior 28 of the vehicle 10. For example, the moveable members 20 may be disposed along door panels located within the interior cabin 26 or a hood located on the exterior 28 of the vehicle 10. In the embodiment as shown in the figures, the plurality of moveable members 20 of the one or more pixels 14 are arranged in a symmetrical pattern, where the moveable members 20 each radiate or extend in a direction radially outward from a center C of each pixel 14. In the example as shown in FIGS. 1 and 2A, the pixel 14 includes four individual moveable members 20, however, it is to be appreciated that FIGS. 1 and 2A are merely exemplary in nature and that the pixel 14 may include as few as two moveable members 20 (seen in FIG. 2B) or up to six moveable members 20 (FIG. 2C).

In the example as shown in the figures, the moveable members 20 are spaced equidistant from one another. As shown in FIG. 2A, the moveable members 20 are positioned about ninety degrees apart. In the example as shown in FIG. 2B, the two moveable members 20 are spaced about one-hundred and eighty degrees apart. In the example as shown in FIG. 2C, the moveable members 20 are spaced about sixty degrees apart. In the embodiment as shown in FIG. 2A, the three-dimensional kinetic shape display 12 includes an array of pixels 14 arranged along the mounting surface 18 of the vehicle 10. The array of pixels 14 are arranged symmetrically in a direction orthogonal to one another. However, it is to be appreciated that the embodiment as shown in FIG. 2A is merely exemplary in nature and in another embodiment the pixels 14 may be staggered or arranged in a non-symmetrical pattern relative to one another as well.

Figure 2D:
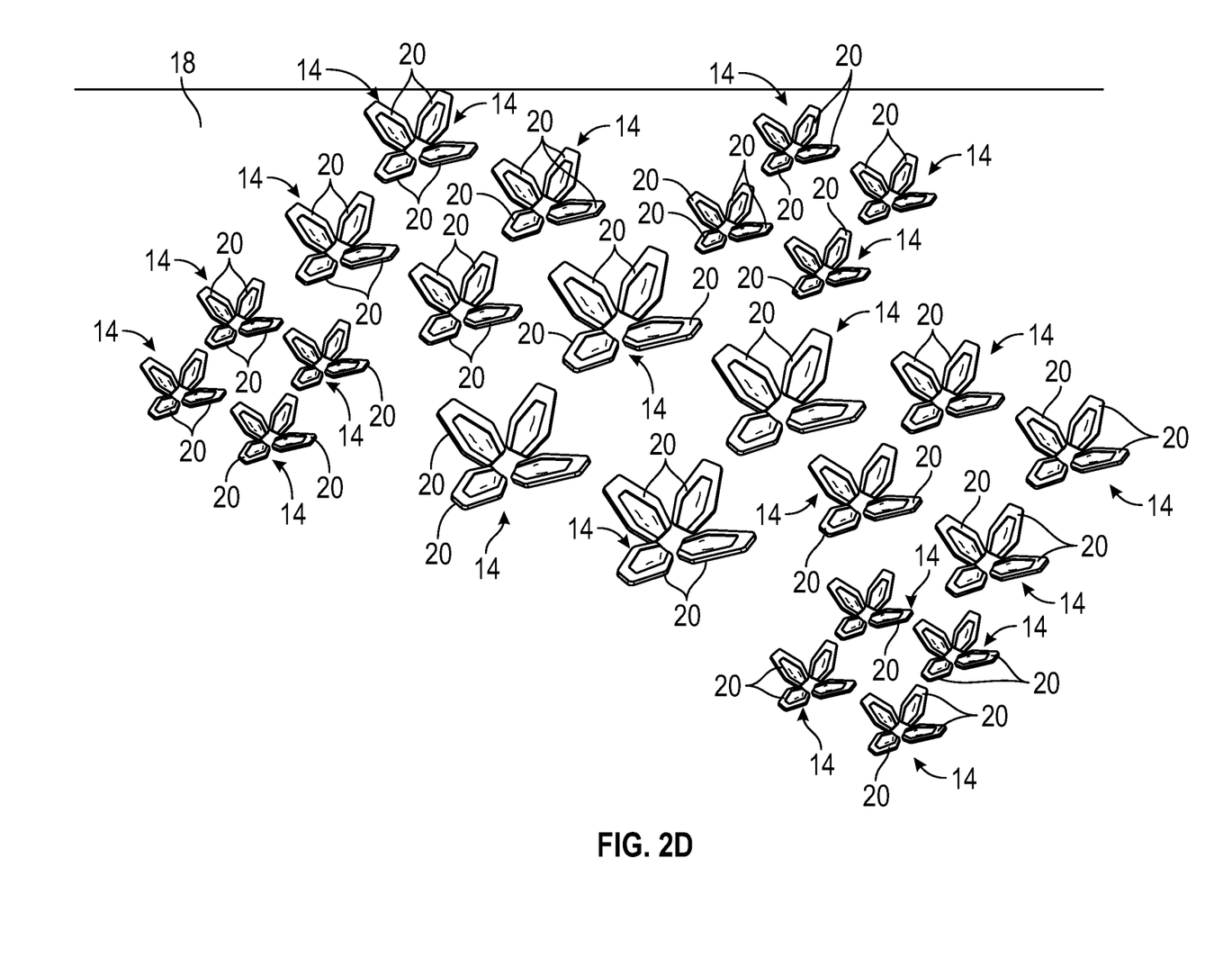
FIG. 2D is a perspective view of a plurality of pixels that vary in size, according to an exemplary embodiment.

In the example as shown in FIG. 2A, the pixels 14 that are part of the array each include moveable members 20 that are identical in size. However, as seen in FIG. 2D, in another embodiment some of the pixels 14 include moveable members 20 that are of a different size when compared to a remainder of the pixels 14. It is to be appreciated that a size of the pixels 14, a variation in size between the moveable members 20 of the pixels 14, and a specific arrangement of the pixels 14 may depend upon the specific application and requirements.

Figure 3:
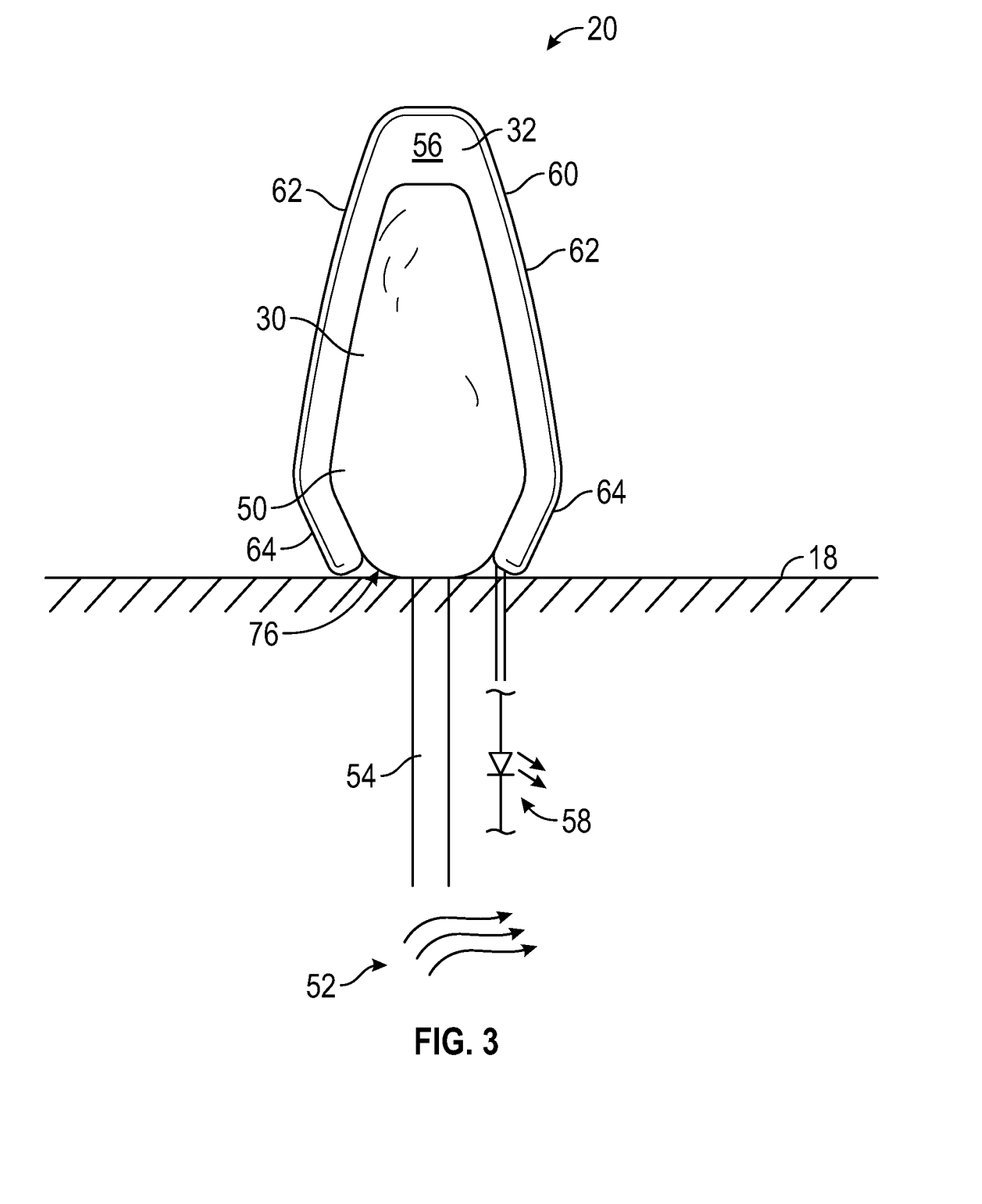
FIG. 3 is a side view of a single moveable member, according to an exemplary embodiment.
Figure 4A:
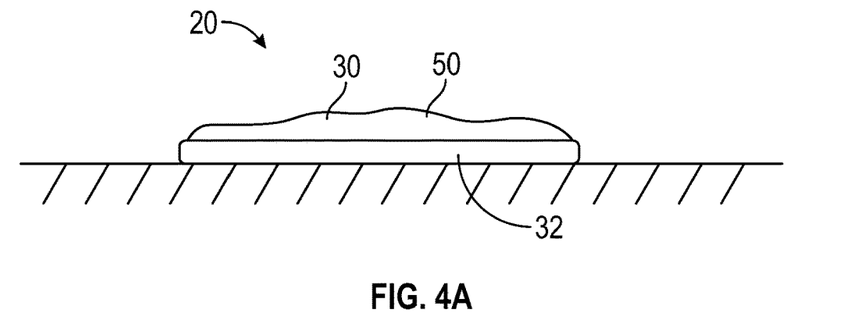
FIG. 4A is a side view of the moveable member when an inflatable bladder is completely deflated, according to an exemplary embodiment.
Figure 4B:
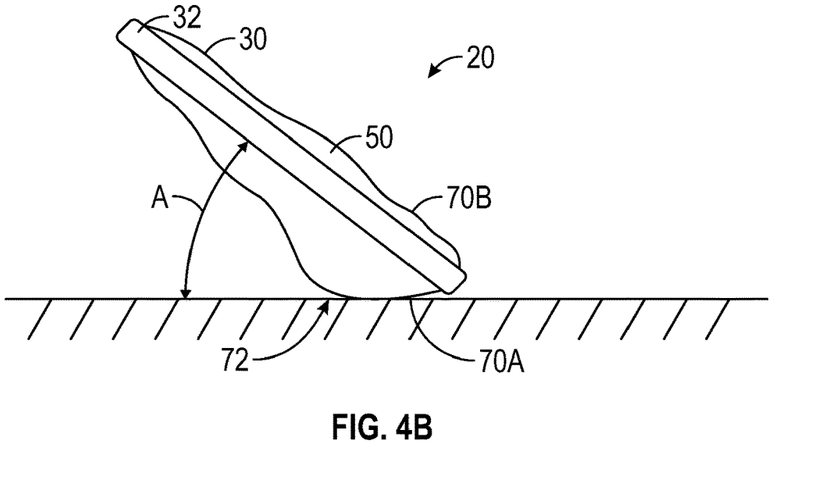
FIG. 4B is a side view of the moveable member when the inflatable bladder is partially inflated, according to an exemplary embodiment.
Figure 4C:
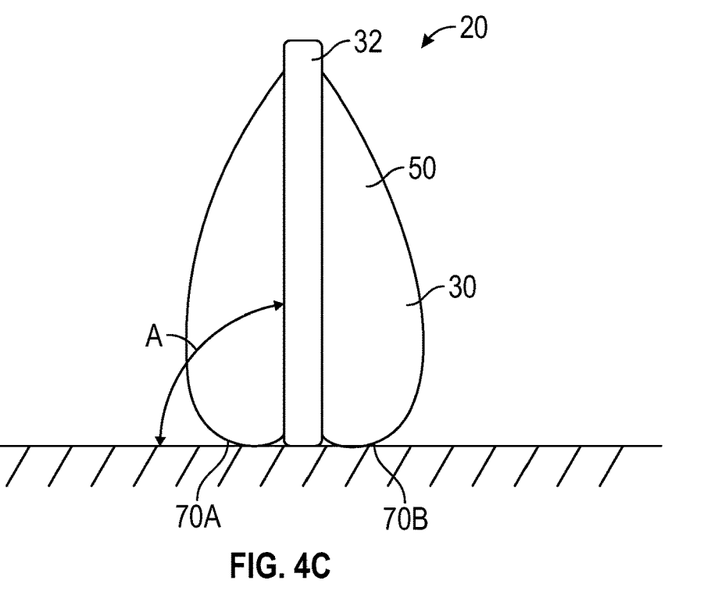
FIG. 4C is a side view of the moveable member when the inflatable bladder is fully inflated, according to an exemplary embodiment.

FIG. 3 is a side view of a single moveable member 20 disposed along the mounting surface 18. Referring to both FIGS. 1 and 3, the actuation element 30 is an inflatable bladder 50 that is in fluid communication with a source of air 52 by a conduit 54. As seen in FIG. 1, the source of air 52 is in electronic communication with the one or more controllers 36. The one or more controllers 36 instruct the source of air 52 to either inflate or deflate the inflatable bladder 50, which is shown in FIGS. 4A-4C and is described in greater detail below. Specifically, the one or more controllers 36 instruct the source of air 52 to inflate the inflatable bladder 50, where inflating the inflatable bladder 50 causes the moveable member 20 to translate in an upward direction, and away from the mounting surface 18. Similarly, the one or more controllers 36 execute instructions to deflate the inflatable bladder 50, where deflating the inflatable bladder 50 causes the moveable member 20 to translate in a downward direction, and towards the mounting surface 18.

Continuing to refer to FIGS. 1 and 3, the light distributing element 32 is configured to convey visible light. Specifically, in an embodiment, the light distributing element 32 is a light pipe 56 for distributing visible light along an outer perimeter 60 of the moveable member 20. The light pipe 56 may be constructed of a translucent or transparent material that conveys visible light generated by a light source 58, where the light source 58 is in optical communication with the light pipe 56. In the example as shown in the figures, the light source 58 is one or more light-emitting diodes (LEDs), however, it is to be appreciated that the figures are merely exemplary in nature. For example, in another embodiment, the light source 58 is a fiber optic element. As seen in FIG. 1, the one or more controllers 36 are in electronic communication with the light source 58.

Figure 5A:
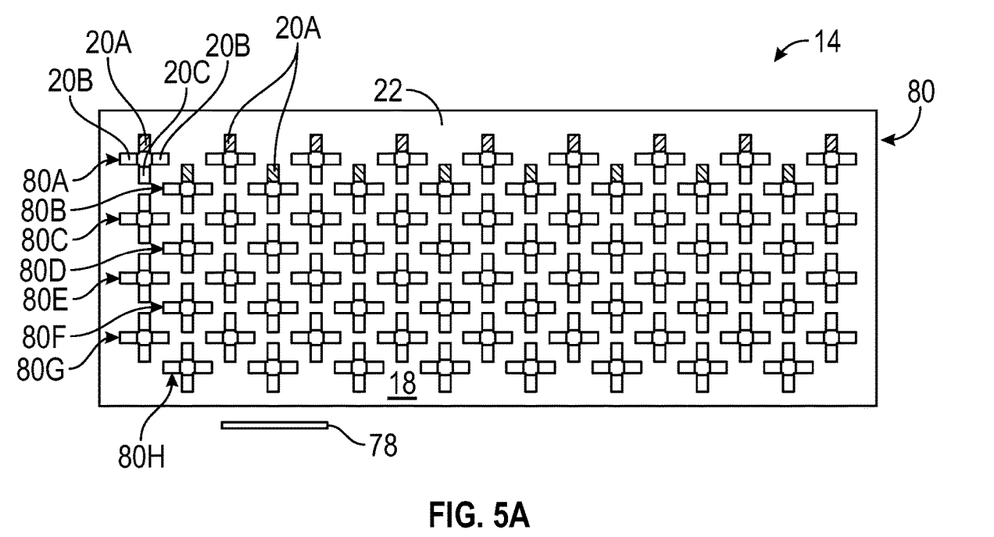
FIG. 5A is an illustration of an array of pixels indicating an upcoming acceleration when the vehicle is operating autonomously, according to an exemplary embodiment.
Figure 5B:
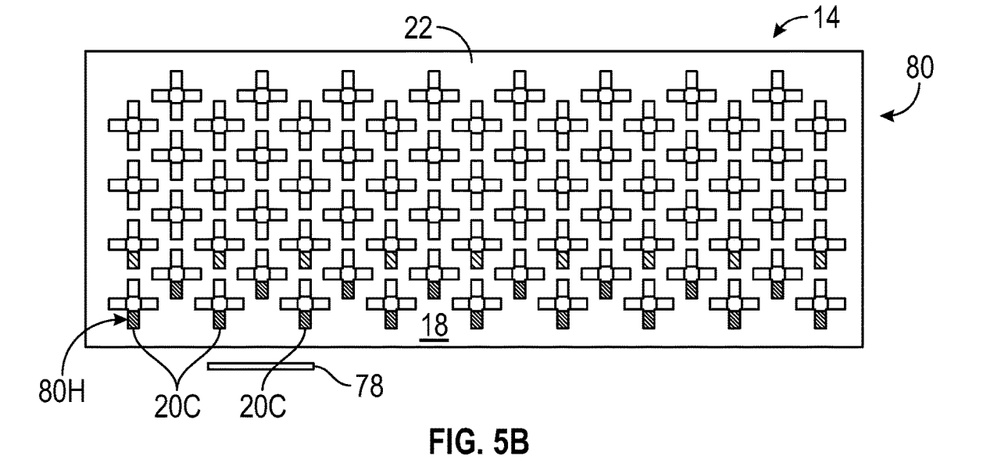
FIG. 5B is an illustration of the array of pixels shown in FIG. 5A indicating an upcoming deceleration, according to an exemplary embodiment.

In an embodiment, the lighting source 58 emits visible light in more than one color. For example, the lighting source 58 may be a red, green, blue (RGB) LED. In an embodiment, the lighting source 58 generates any number or variety of different colors such as purple, green yellow, and the like. The color of the visible light conveyed by the light distributing element 32 may be used to convey information related to the event related to operation of the vehicle 10. Specifically, in response to receiving data indicating the event, the one or more controllers 36 instruct the light source 58 to generate visible light based on the event. For example, if the vehicle 10 is an autonomous vehicle, in one embodiment the event is an upcoming maneuver such as an upcoming acceleration or deceleration. If the event is an upcoming acceleration, then the visible light conveyed by the light distributing element 32 is green, and if the event is an upcoming deceleration, then the visible light conveyed by the light distributing element is red. In addition to the color of the visible light, the one or more controllers 36 may be able to control an intensity and duration of the visible light emitted by the light source 58 as well. For example, as explained below and as shown in FIGS. 5A and 5B, the visible light may be modulated to create a wave of visible light and pixel movement dispersed along the array of pixels 14 to indicate an upcoming maneuver of the vehicle 10.

In the example as shown in FIG. 3, the outer perimeter 60 of the light distributing element 32 of the moveable member 20 is shaped as an irregular hexagon where two upper sides 62 of the hexagon are longer in length when compared to two lower sides 64. However, it is to be appreciated that the figures are merely exemplary in nature, and the moveable members 20 may include any number of shapes and profiles. In the example as shown in the figures, the light distributing element 32 surrounds the actuation element 30 (i.e., the inflatable bladder 50), where the light distributing element 32 acts as a structural member to provide stiffness and rigidity to the moveable member 20.

Referring now to FIGS. 1 and 4A-4C, the inflatable bladder 50 is gradually inflated from a completely deflated position in FIG. 4A where the moveable member 20 lies flat against the surface 18 and into a fully inflated position as seen in FIG. 4C where the moveable member 20 is orthogonal with respect to the surface 18. Although FIGS. 4A-4C illustrate three different positions, it is to be appreciated that the inflatable bladder 50 is positionable into an infinite number of angled position relative to the mounting surface 18. Specifically, FIG. 4A is an illustration of the inflatable bladder 50 in a completely deflated position, FIG. 4B is an illustration of the inflatable bladder 50 in a partially inflated position, and FIG. 4C is an illustration of the inflatable bladder 50 in a fully inflated position. As seen in FIG. 4A, when the inflatable bladder 50 is completely deflated the moveable member 20 lies flat against the mounting surface 18. However, referring to FIG. 4B, as the inflatable bladder 50 inflates and fills with air, the moveable member 20 is lifted off the mounting surface 18 along a hinge 76 (seen in FIG. 3), where the hinge 76 connects the moveable member 20 to the mounting surface 18.

In the embodiment as shown in FIG. 4B, the inflatable bladder 50 is partially inflated and the moveable member 20 is positioned at an acute angle A relative to the mounting surface 18. In the example as shown in FIG. 4B, the acute angle A is about 45 degrees, however, it is to be appreciated that FIG. 4B is merely exemplary in nature and the moveable member 20 may be positioned into an infinite number of angles relative to the mounting surface 18 based on a level of inflation of the inflatable bladder 50. As seen in FIG. 4B, the inflatable bladder 50 defines opposing side walls 70A, 70B, where one of the side walls 70A is stiffer when compared to a remaining side wall 70B of the inflatable bladder 50. Thus, as the inflatable bladder 50 inflates, the side wall 70A creates a ledge 72 that supports the moveable member 20 and urges the moveable member 20 into the acute angle A relative to the mounting surface 18. As seen in FIG. 4C, when the inflatable bladder 50 is in the fully inflated position the moveable member 20 is orthogonal with respect to the mounting surface 18, and both sides walls 70A and 70B abut against the mounting surface 18.

Referring to FIGS. 2 and 4A-4C, it is to be appreciated that the moveable members 20 of each pixel 14 are individually actuated and illuminated. In the example as shown in FIG. 2A, each pixel 14 has each moveable member 20 lifted from the mounting surface 18. However, in another embodiment, only one or only a portion of the moveable members 20 may be lifted instead. For example, in the embodiment as shown in FIG. 2A, only a left moveable member 20 of each pixel 14 may be lifted to indicate an upcoming maneuver such as a left turn. Similarly, only a right moveable member 20 of each pixel 14 may be lifted to indicate an upcoming right turn. Although FIG. 2A illustrates each moveable member 20 lifted about the same distance from the mounting surface 18, in another embodiment the moveable members 20 for each pixel 14 may be lifted at different distances from the mounting surface 18.

FIGS. 5A and 5B illustrate an exemplary array of pixels 14 disposed along the mounting surface 18. In the example as shown in FIGS. 5A and 5B, the mounting surface 18 is the instrument panel 22 of the vehicle 10 (FIG. 1), where a steering wheel 78 is shown in indicate a position of a driver. In the present example, the vehicle 10 operates autonomously, however, as mentioned above, the vehicle 10 may be manually driven as well. The array of pixels 14 create a wave of visible light and pixel movement that is dispersed along the array of pixels to indicate an upcoming maneuver that the vehicle 10 completes during autonomous driving.

In the example as shown in FIG. 5A, a front row 80A of pixels 14 positioned furthest from the driver that are part of the array of pixels 14 are selected to actuate first, where a front moveable member 20A of each pixel 14 located in the front row 80A is lifted and illuminated first. After lifting and illuminating the front moveable member 20A, the two side moveable members 20B may be lifted and illuminated next. Then a rear moveable member 20 of each pixel 14 located in in the front row 80A may be lifted and illuminated. Then, a front moveable member 20A for the row 80B of pixels 14 located immediately adjacent to the front row 80A of pixels 14. This is continued until the last row of pixels 80H are lifted. The lifting and illumination of pixels 14 from the front row 80A to the rear row of pixels 80H create a waveflow of physical movement and visible light to inform the driver of an upcoming maneuver. For example, in the embodiment as shown in FIG. 5A, the maneuver is an acceleration of the vehicle 10. In one embodiment, the moveable members 20 may be illuminated gradually using the color green to indicate acceleration.

In the embodiment as shown in FIG. 5B, the upcoming maneuver is a deceleration of the vehicle 10. Therefore, the rear moveable members 20C of each pixel 14 located in the rear row 80H of the array are lifted first instead to create the waveflow of physical light and movement. Since the upcoming maneuver is a deceleration, the moveable members 20 are illuminated using the color red. Although acceleration and deceleration are described, it is to be appreciated that the present disclosure only described one example for purposes of simplicity and brevity, and that other types of maneuvers may be used as well. Some examples of other events related to operation of the vehicle that may be communicated using the pixels 14 include, but are not limited to, completing a left or right turn, object detection display, control transitional display (where control is transitioned from user to vehicle and from vehicle to user), or a battery state-of-charge.

Referring generally to the figures, the disclosed a three-dimensional kinetic shape display include pixels having a plurality of moveable members that provide visual information related to operation of the vehicle. In embodiment, the three-dimensional kinetic shape display may be used to communicate upcoming driving maneuvers to occupants of the vehicle during autonomous driving, which in turn may improve or enhance an individual's confidence and trust when employing an autonomous driving system.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A three-dimensional kinetic shape display for a vehicle, the three-dimensional kinetic shape display comprising:
    an array of pixels for conveying information related to operation of the vehicle, wherein each pixel of the array of pixels includes a plurality of moveable members that are grouped together in a symmetrical pattern where each of the moveable members extend in a direction radially outward from a center of a corresponding pixel, and wherein each moveable member is individually activated and has an actuation element for translating a corresponding moveable member, and wherein a single moveable member located in a specific position relative to the remaining members of each of pixel is translated to indicate an event related to operation of the vehicle; and
    one or more controllers providing instructions to move the actuation element for each of the moveable members, wherein the one or more controllers execute instructions to:
        receive data indicating the event related to the operation of the vehicle; and
        in response to receiving data indicating the event, instruct a selected one of the actuation elements to translate a corresponding moveable member in a direction that is indicative of the event related to the operation of the vehicle.

2. The three-dimensional kinetic shape display of claim 1, wherein the moveable members further comprise a light distributing element conveying visible light.

3. The three-dimensional kinetic shape display of claim 2, further comprising a lighting source in electronic communication with the one or more controllers, wherein the lighting source is in optical communication with the lighting distributing element.

4. The three-dimensional kinetic shape display of claim 3, wherein the one or more controllers execute instructions to:
    in response to receiving data indicating an event, instruct the lighting source to generate the visible light based on the event related to operation.

5. The three-dimensional kinetic shape display of claim 3, wherein the lighting source emits visible light in more than one color.

6. The three-dimensional kinetic shape display of claim 3, wherein the lighting source is either one or more light-emitting diodes (LEDs) or a fiber optic element.

7. The three-dimensional kinetic shape display of claim 3, wherein the light distributing element is a light pipe that conveys the visible light.

8. The three-dimensional kinetic shape display of claim 1, further comprising a source of air in electronic communication with the one or more controllers, wherein the actuation element is an inflatable bladder that is in fluid communication with the source of air.

9. The three-dimensional kinetic shape display of claim 8, wherein the inflatable bladder is inflatable from a completely deflated position into a fully inflated position.

10. The three-dimensional kinetic shape display of claim 9, wherein the moveable member lies flat against a mounting surface when the inflatable bladder is in the completely deflated position.

11. The three-dimensional kinetic shape display of claim 10, wherein the moveable member is orthogonal with respect to the mounting surface when the inflatable bladder in the fully inflated position.

12. The three-dimensional kinetic shape display of claim 1, wherein the pixels include up to six moveable members.

13. The three-dimensional kinetic shape display of claim 1, wherein the array of pixels are arranged along a mounting surface of the vehicle.

14. The three-dimensional kinetic shape display of claim 13, wherein a portion of the array of pixels include moveable members that are of a different size when compared to a remainder of the array of pixels.

15. The three-dimensional kinetic shape display of claim 13, wherein the array of pixels includes a plurality of pixels that include moveable members that are identical in size.

16. The three-dimensional kinetic shape display of claim 13, wherein the array of pixels are arranged in a symmetrical pattern in a direction orthogonal to one another.

17. The three-dimensional kinetic shape display of claim 13, wherein the array of pixels create a wave of visible light and pixel movement that is dispersed along the array of pixels to indicate an upcoming maneuver that the vehicle completes during autonomous driving.

18. The three-dimensional kinetic shape display of claim 17, wherein the upcoming maneuver is an acceleration or a deceleration of the vehicle.

19. A three-dimensional kinetic shape display for a vehicle, the three-dimensional kinetic shape display comprising:
an array of pixels for conveying information related to operation of the vehicle, wherein each pixel of the array of pixels includes a plurality of moveable members that are grouped together in a symmetrical pattern where each of the moveable members extend in a direction radially outward from a center of a corresponding pixel, and wherein each moveable member is individually activated and has an inflatable bladder for translating a corresponding moveable member and a light distributing element conveying visible light, and wherein a single moveable member located in a specific position relative to the remaining members of each of pixel is translated to indicate an event related to operation of the vehicle;
a lighting source is in optical communication with the lighting distributing element;
a source of air in fluid communication with the inflatable bladder; and
one or more controllers in electronic communication with the lighting source and the source of air for each of the moveable members, wherein the one or more controllers execute instructions to:
receive data indicating the event related to the operation of the vehicle;
in response to receiving data indicating the event, instruct the source of air to either inflate or deflate a selected inflatable bladder based on the event related to operation of the vehicle; and
in response to receiving data indicating the event, instruct the lighting source to generate the visible light based on the event related to operation of the vehicle.

20. The three-dimensional kinetic shape display of claim 19, wherein the moveable member lies flat against a mounting surface when the inflatable bladder is in a completely deflated position.

* * * * *